(12) United States Patent
Takagi

(10) Patent No.: US 9,562,993 B2
(45) Date of Patent: Feb. 7, 2017

(54) REFRACTIVE INDEX DISTRIBUTION STRUCTURE AND MANUFACTURING METHOD OF THE SAME, AND IMAGE DISPLAY APPARATUS HAVING THE REFRACTIVE INDEX DISTRIBUTION STRUCTURE

(75) Inventor: Akinari Takagi, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 13/422,357

(22) Filed: Mar. 16, 2012

(65) Prior Publication Data

US 2012/0257281 A1   Oct. 11, 2012

(30) Foreign Application Priority Data

Apr. 8, 2011   (JP) .................................. 2011-086193

(51) Int. Cl.
  *G02B 5/02*   (2006.01)
  *B29D 11/00*   (2006.01)

(52) U.S. Cl.
  CPC ....... *G02B 5/0221* (2013.01); *B29D 11/00798* (2013.01); *G02B 5/0226* (2013.01)

(58) Field of Classification Search
  CPC ................ G02B 5/0231; G02B 5/0242; B29D 11/00798; G02F 1/133504
  USPC ......................... 359/599, 601, 609, 613–614; 428/403–407, 323, 325–327, 372, 402, 428/402.21, 402.24; 349/86, 112; 501/33–34, 901–903; 362/355
  See application file for complete search history.

(56) References Cited

U.S. PATENT DOCUMENTS

| | | | |
|---|---|---|---|
| 2004/0263965 A1* | 12/2004 | Honda | 359/452 |
| 2006/0186803 A1 | 8/2006 | Lim et al. | |
| 2008/0299393 A1* | 12/2008 | Wu et al. | 428/407 |
| 2010/0247915 A1* | 9/2010 | Furukawa et al. | 428/403 |
| 2012/0326182 A1 | 12/2012 | Nobayashi | |

FOREIGN PATENT DOCUMENTS

| | | |
|---|---|---|
| JP | 11-109113 A | 4/1999 |
| WO | 2009-128441 A1 | 10/2009 |

OTHER PUBLICATIONS

H.W. Deckman et al., "Natural Lithography," Appl. Phys. Lett. vol. 41, No. 4, pp. 377-379 (Aug. 15, 1982).

* cited by examiner

*Primary Examiner* — Kimberly N Kakalec
(74) *Attorney, Agent, or Firm* — Fitzpatrick, Cella, Harper & Scinto

(57) ABSTRACT

There is provided a method of manufacturing a refractive index distribution structure having a plurality of microparticles, suppressing density unevenness between the plurality of microparticles, capable of obtaining uniform in-plane characteristics, and capable of maintaining stability and high reproducibility. The method of manufacturing a refractive index distribution structure includes manufacturing a plurality of core-shell microparticles including a shell and a core microparticle contained in the shell, the core microparticle being made of a material having a refractive index higher than the material forming the shell and having the same core diameter, and the shell having a different shell thickness; and forming a refractive index distribution structure by arranging the plurality of core-shell microparticles on a substrate.

7 Claims, 7 Drawing Sheets

REFRACTIVE INDEX DISTRIBUTION STRUCTURE AND MANUFACTURING METHOD OF THE SAME, AND IMAGE DISPLAY APPARATUS HAVING THE REFRACTIVE INDEX DISTRIBUTION STRUCTURE

BACKGROUND OF THE INVENTION

Field of the invention

The present invention relates to a refractive index distribution structure and a manufacturing method of the same, and an image display apparatus having the refractive index distribution structure. In particular, the present invention relates to a refractive index distribution structure for use in a light diffusion plate and a manufacturing method of the same.

Description of the Related Art

The refractive index distribution structure including a background medium and a plurality of elements, having a refractive index different from that of the background medium, which is contained in the background medium, is used as various optical functional devices such as a photonic crystal and a light diffusion plate.

When light is incident on the refractive index distribution structure, the angular characteristics of the scattered light transmitted or reflected therein are as follows. When the elements are arranged periodically, the angular characteristics are such that the scattered light intensity in a specific direction corresponding to each diffraction order is strong due to interference of lights diffracted by the elements. Meanwhile, when the elements are arranged in a completely random manner, the angular characteristics of light-scattering are uniform. In some cases, e.g. when the structure is used for screen, the angular characteristics of light-scattering need to be appropriately controlled. In this case, if the angular characteristics of the light-scattering are to be controlled, the element shapes should be made uniform, the elements should be randomly arranged, and the average value of each inter-element distance (distance between elements) and the variation from the average value should be appropriately managed.

As a method of manufacturing an appropriately controlled random refractive index distribution structure, there has been known a method of forming a microsphere-dispersed refractive index distribution structure (H. W. Deckman et al. "Natural Lithography," Appl. Phys. Lett. vol. 41, No. 4, pp. 377, (Aug. 15, 1982)). Such a refractive index distribution structure is configured to manage the average distance between microspheres such that the number of microspheres dispersed per unit area is made smaller than the number of microspheres required for closest packing.

SUMMARY OF THE INVENTION

Unfortunately, the above conventional refractive index distribution structure has the following problems.

As illustrated in FIG. 7A, in a conventional refractive index distribution structure, since both areas of an area in which microspheres are densely arranged and an area in which microspheres are sparsely arranged are formed, it has an uneven density in microsphere. The frequency distribution of the inter-microsphere distance (distance between microspheres) at this time is illustrated in FIG. 7B.

The angular distribution of the scattered light of the refractive index distribution structure has a spread according to the variation in inter-microsphere distance around the angle determined by the average inter-microsphere distance. Consequently, the unevenness in the variation of the inter-microsphere distance in the plane causes variation of the light-scattering characteristics depending on the place, whereby desired optical characteristics uniform in the plane cannot be obtained. Further, the variation of the inter-microsphere distance changes for each manufacturing, resulting in low reproducibility.

In view of the above problems, it is an object of the present invention to provide a refractive index distribution structure and a manufacturing method of the same, and an image display apparatus having the refractive index distribution structure having a plurality of microparticles, suppressing density unevenness between the plurality of microparticles, capable of obtaining uniform in-plane characteristics, and capable of maintaining stability and high reproducibility.

Therefore, a method of manufacturing the refractive index distribution structure of the present invention includes: manufacturing a plurality of core-shell microparticles including a shell and a core microparticle contained in the shell, the core microparticle being made of a material having a refractive index higher than the material forming the shell and having the same core diameter, and the shell having a different shell thickness; and forming a refractive index distribution structure by arranging the plurality of core-shell microparticles on a substrate.

In another aspect, the refractive index distribution structure of the present invention has a structure having a plurality of core-shell microparticles including a shell and a core microparticle contained in the shell. In the plurality of core-shell microparticles, each core microparticle has the same core diameter and each shell has a different shell thickness; and the core microparticle is made of a material having a refractive index higher than the material forming the shell.

An image display apparatus of the present invention has the aforementioned refractive index distribution structure.

The present invention can provide a refractive index distribution structure and a manufacturing method of the same, and an image display apparatus having the refractive index distribution structure, the refractive index distribution structure having a plurality of arranged microparticles, suppressing density unevenness between the plurality of microparticles, capable of obtaining uniform in-plane characteristics, and capable of maintaining stability and high reproducibility. In particular, when used as an optical element, uniform in-plane light-scattering characteristics can be obtained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention provides a refractive index distribution structure in which a plurality of core-shell microparticles is densely arranged, each core microparticle has a constant diameter, and the variation in the shell thickness is managed. Thus, the present invention can provide a refractive index distribution structure having a desired variation of distance between cores of microparticles and desired average of distance between cores of microparticles; suppressed density unevenness between the plurality of microparticles; uniform in-plane characteristics; and high reproducibility and stability. Hereinafter, embodiments of the present invention will be described.

First Embodiment

As a first embodiment, a configuration example of a refractive index distribution structure and a manufacturing method of the same according to the present invention will be described with reference to FIGS. 1A, 1B, and 2.

Figure 1A:
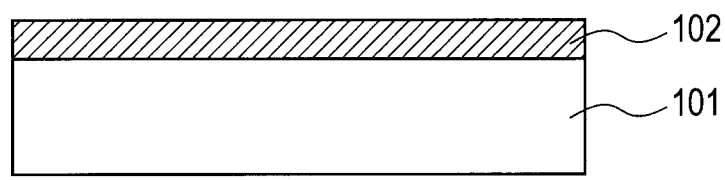
FIGS. 1A and 1B describe a method of manufacturing a refractive index distribution structure according to a first embodiment of the present invention.
Figure 1B:
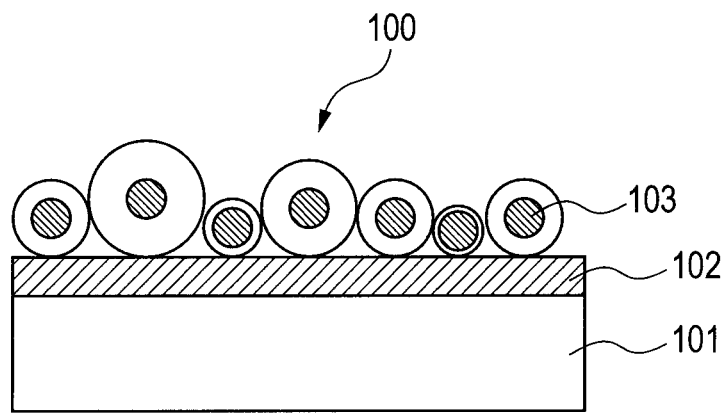
Figure 2:
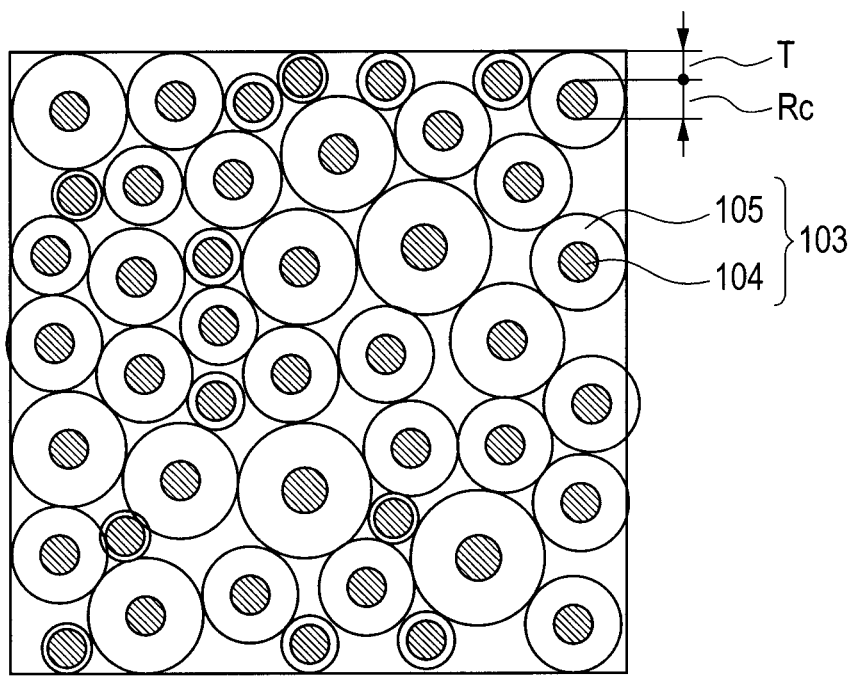
FIG. 2 is a top view of the refractive index distribution structure illustrated in FIG. 1B according to the first embodiment of the present invention.

FIGS. 1A and 1B describe the method of manufacturing the refractive index distribution structure according to the present embodiment. FIG. 2 is a top view of the refractive index distribution structure illustrated in FIG. 1B. The Figures illustrate a refractive index distribution structure 100, a substrate 101, a bonding layer 102, a core-shell microparticle 103, a core microparticle 104 (hereinafter referred to as a core) and a shell 105.

The refractive index distribution structure 100 of the present embodiment has a structure having a plurality of core-shell microparticles. The plurality of core-shell microparticles includes a shell having a different shell thickness and a core contained in the shell, the core being made of a material having a refractive index higher than the material forming the shell and having the same core diameter.

Next, the method of manufacturing the core-shell microparticles according to the present embodiment will be described. First, as illustrated in FIG. 1A, the bonding layer 102 is formed on the substrate 101. Then, a plurality of core-shell microparticles is arranged on the substrate in the following manner that: the core-shell microparticles 103 are dispersed in a solvent; the dispersed solvent is applied to the bonding layer 102; the solvent is removed by drying or the like. Then, the plurality of core-shell microparticles 103 is densely arranged in a layer so as to contact the shells to each other. Further, excess core-shell microparticles are removed to manufacture the refractive index distribution structure 100 (FIG. 1B). The top view of thus manufactured refractive index distribution structure 100 is illustrated in FIG. 2.

In the core-shell microparticle 103 for use in the above manufacturing method, the refractive index of the material for forming the core 104 is higher than the refractive index of the material for forming the shell 105. Thus, the shape and the in-plane arrangement of the core 104 can determine the light-scattering characteristics of the refractive index distribution structure 100. The plurality of core-shell microparticles 103 includes the core 104 having a constant core diameter Rc and the shell 105 having a shell thickness T.

Figure 3A:
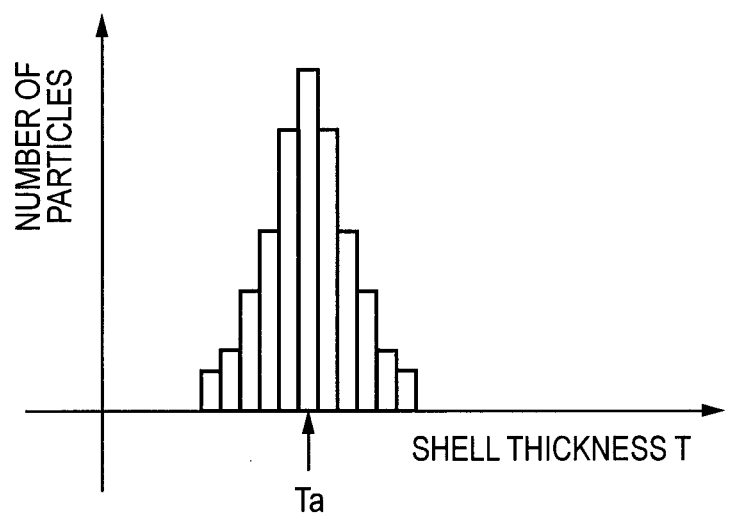
FIG. 3A is a graph illustrating a frequency distribution between the number of core-shell microparticles and shell thickness T according to the first embodiment of the present invention.

FIG. 3A is a graph illustrating a frequency distribution between the number of core-shell microparticles 103 and the shell thickness T. The shell thickness T has a desired variation around the average shell thickness Ta.

Figure 3B:
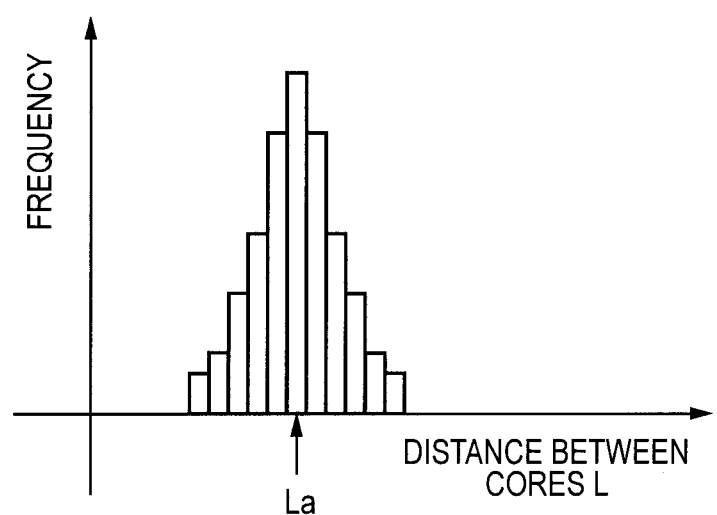
FIG. 3B is a graph illustrating a frequency distribution between the number of core-shell microparticles and intercore-microparticle distance L according to the first embodiment of the present invention.

FIG. 3B is a graph illustrating a frequency distribution between the number of core-shell microparticles 103 illustrated in FIG. 3A and the inter-core-microparticle distance L (distance between the cores 104) of the refractive index distribution structure 100.

The average value La of the inter-core-microparticle distance L can be calculated by the following expression (1).

$$La = Rc + Ta \times 2 \qquad \text{(Expression 1)}$$

Further, the variation amount of the inter-core-microparticle distance L is equal to twice the variation amount of the shell thickness T.

As described above, the core-shell microparticles having a constant core diameter, and having a desired frequency distribution between the shell thickness and the number of microparticles, are densely arranged. Thus, the refractive index distribution structure having a constant core diameter and a desired variation between the average inter-core-microparticle distance and the inter-core-microparticle distance can be manufactured to be uniform in the plane and to have a high reproducibility. Further, the structure having a plurality of core-shell microparticles with a constant core diameter and a different shell thickness can provide a refractive index distribution structure in which the position in a height direction of the core is different in the plane depending on the difference in shell thickness and thereby can increase the light scattering.

A method of manufacturing the core-shell microparticles having a constant core diameter and a different shell thickness is as follows.

The method of manufacturing such core-shell microparticles may be implemented by a physical method such as a pyrolysis method by spraying using several types of elements, a thermal plasma process, a vacuum evaporation coating method, and an in-air suspension coating method. Other methods may include an alkoxide method for subjecting metal alkoxide complexes to hydrolytic polymerization, a phase separation method from an aqueous system or an organic solvent system, and an interfacial polymerization method. The above well-known methods can be used to control the manufacturing conditions to manufacture core-shell microparticles including a core microparticle to be a nucleus having a constant diameter and a shell having a desired variation of thickness.

Alternatively, monodisperse core particles are manufactured by a well-known method and then shells are formed by a well-known method. Subsequently, the monodisperse core particles are divided based on the outer diameter of the core-shell microparticles and mixed with core-shell microparticles having a different outer diameter so as to achieve a desired variation.

The materials of the cores and shells can be arbitrarily selected from two materials having a different refractive index. For example, a dielectric material such as $SiO_2$, $TiO_2$, $Al_2O_3$, and ZnO, an organic polymer, a metal, a semiconductor, and the like are used.

In the present invention, the constant core diameter means that the core diameter is constant in a range in which the core particles can be regarded as monodisperse, for example, indicating that the variation of the core diameter is within 10%.

In order to increase manufacturing reproducibility, the core-shell microparticles are desired to be densely arranged so as to contact the shells thereof to each other. The core-shell microparticles are desirably arranged such that the core-shell microparticles containing the shell portion in an in-plane direction of arranging the core-shell microparticles have an area filling factor of 0.5 or higher, and more desirably 0.7 or higher.

Figure 4A:
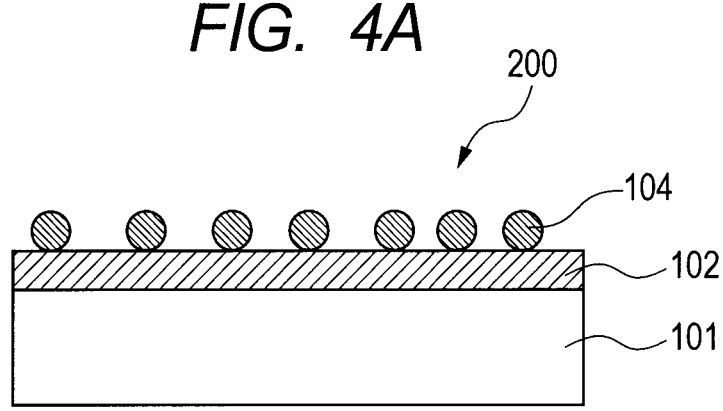
FIGS. 4A, 4B, and 4C describe a method of manufacturing other refractive index distribution structures according to the first embodiment of the present invention.
Figure 4B:
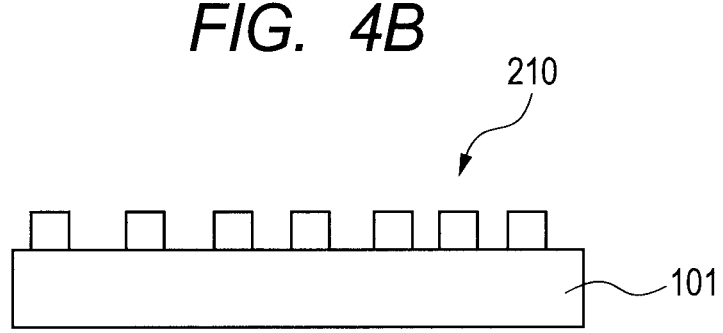
Figure 4C:
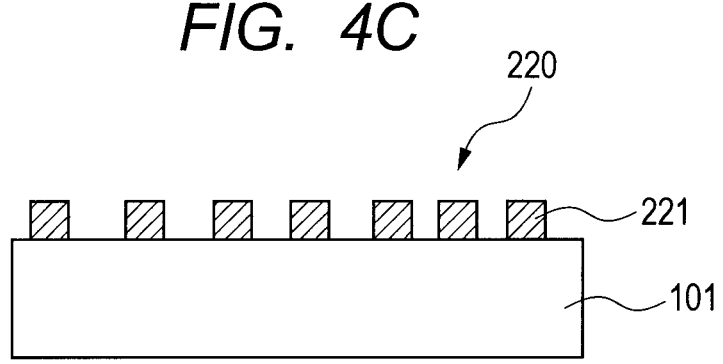

Note that as illustrated in FIG. 4A, the shell 105 may be removed by etching to form a refractive index distribution structure 200 having only the core particle 104. Removal of shells can increase the freedom of choice of the medium surrounding the core particle and can increase the freedom of light-scattering characteristics. Further, using the structure illustrated in FIG. 4A as an etching mask, the substrate 101 may be etched to form a refractive index distribution structure 210 of a columnar structure (FIG. 4B). Furthermore, a thin film 221 formed on the substrate 101 may be etched to form a refractive index distribution structure 220 (FIG. 4C). Of course a structure having the core-shell microparticle 103 illustrated in FIG. 2 without removing the shell 105 may be used as the etching mask.

Thus, a structure having core-shell microparticles is used as the etching mask to form a refractive index distribution structure having a columnar structure, whereby the freedom of the refractive index of the refractive index distribution structure can be increased and the freedom of the light-scattering characteristics can be increased. Further, the thickness of the refractive index distribution structure can be changed by the etching depth, and thus the freedom of the light-scattering characteristics can be further increased.

The present embodiment uses a structure having core-shell microparticles arranged in one layer. Alternatively, a plurality of layers may be stacked to form a three-dimensional refractive index distribution structure.

Second Embodiment

As a second embodiment, a configuration example in which the refractive index distribution structure of the present invention is applied to an image display apparatus will be described with reference to FIGS. 5A and 5B.

Figure 5A:
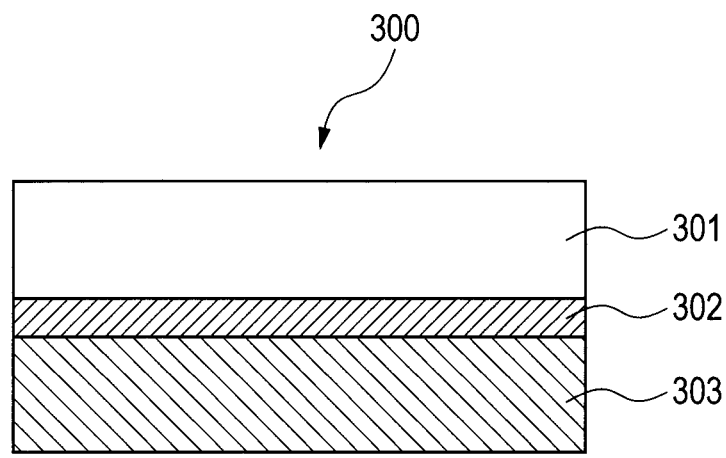
FIG. 5A is a side view of an image display apparatus having a refractive index distribution structure according to a second embodiment of the present invention.
Figure 5B:
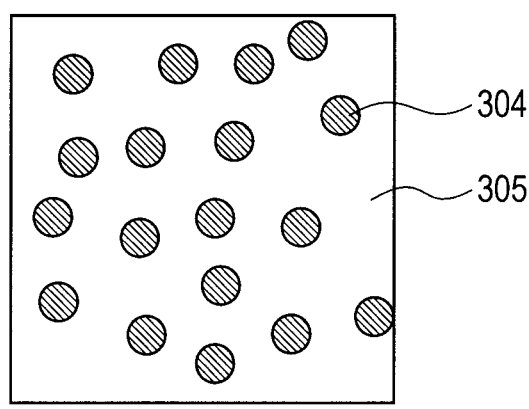
FIG. 5B is a top view of a refractive index distribution structure of the image display apparatus according to the second embodiment of the present invention.

An image display apparatus 300 of the present embodiment includes a substrate 301, a refractive index distribution structure 302, and a light emitting layer 303, which are formed in that order viewed from an image observer side (FIG. 5A). The refractive index distribution structure 302 includes a background medium (shell) 305 and a element (core microparticle) 304 contained in the background medium such that a plurality of element 304 made of a material having a refractive index higher than the refractive index of the material forming the background medium 305 is randomly arranged in the background medium 305 made of a material having a low refractive index (FIG. 5B). The refractive index distribution structure 302 has a function of scattering and reflecting outside light incident from the image observer side; and a function of diffracting and scattering display light emitted by the light emitting layer 303 to be extracted on the image observer side.

When outside light is scattered and reflected, a periodically arranged element 304 forming the refractive index distribution structure 302 increases the scattered light intensity in a specific direction determined by the wavelength of the outside light and the period of the refractive index distribution structure 302. The direction in which the scattered light intensity increases depends on the wavelength, whereby the reflected image is subjected to color breakup. In order to avoid the color breakup, the elements 304 need to be randomly arranged.

The angular distribution of the scattered and reflected light of the refractive index distribution structure 302 has a spread according to the variation of the inter-element distance (distance between elements) around an angle determined by the wavelength of the outside light and the average value of the inter-element distance. At this time, the color breakup of the reflected image can be reduced by setting the range of the spread of the reflected and scattered light of each color so as to contain the direction in which the reflected and scattered light intensity of each color increases. More specifically, assuming that La is the average value of the inter-element distance and Ls is the standard deviation of the inter-element distance, in order to overlap the reflected and scattered light of blue light with a wavelength of 450 nm and red light with a wavelength of 650 nm, the following expression (2) needs to be satisfied.

Note that the variation amount Ls of the inter-element distance (inter-core-microparticle distance) is rms (positive square root of the sum of the squares) of the difference from the average value La of the inter-element distance (inter-core-microparticle distance).

$$0.18 < Ls/La \quad \text{(Expression 2)}$$

In order that the reflected and scattered light of light with a wavelength of 400 nm and light with a wavelength of 700 nm which are the end of the visible wavelength range is overlapped with each other, the following expression (3) needs more desirably to be satisfied.

$$0.27 < Ls/La \quad \text{(Expression 3)}$$

Meanwhile, in order to diffract and scatter the display light emitted by the light emitting layer 303 to be effectively extracted on the image observer side, it is necessary to increase the component of the light whose incident angle at an interface on the observer side of the substrate 301 is within a critical angle. Thus, it is desirable to enhance not the uniform light-scattering characteristics but the light-scattering intensity in the specific direction of the light whose incident angle at an interface on the observer side of the substrate 301 is within a critical angle.

Thus, in order to increase the display light extraction efficiency by installing the refractive index distribution structure, the following expression (4) needs to be satisfied.

$$Ls/La < 0.8 \quad \text{(Expression 4)}$$

More desirably, the following expression (5) needs to be satisfied.

$$Ls/La < 0.6 \quad \text{(Expression 5)}$$

As described above, the refractive index distribution structure 302 assuming that, for example, the inter-element distance La is 2.6 μm and the variation amount Ls of the inter-element distance is 0.3 can be used to provide an image display apparatus having an outside light diffuse reflection characteristics without color breakup and a high display light extraction efficiency.

A method of manufacturing the refractive index distribution structure 302 is as follows.

Figure 6A:
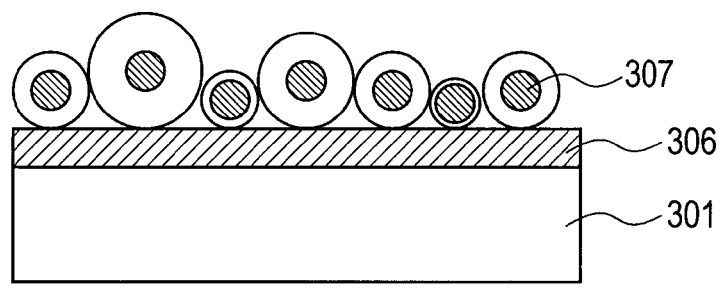
FIGS. 6A, 6B, 6C, and 6D describe a method of manufacturing the refractive index distribution structure according to the second embodiment of the present invention.
Figure 6B:
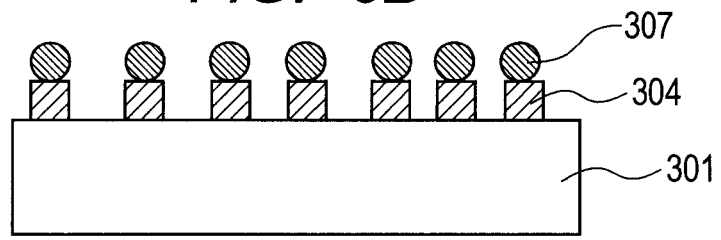
Figure 6C:
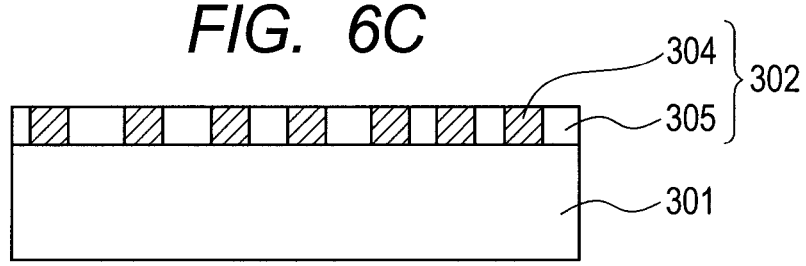
Figure 6D:
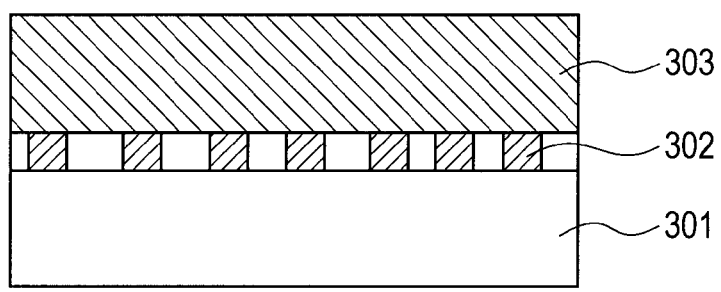
Figure 7A:
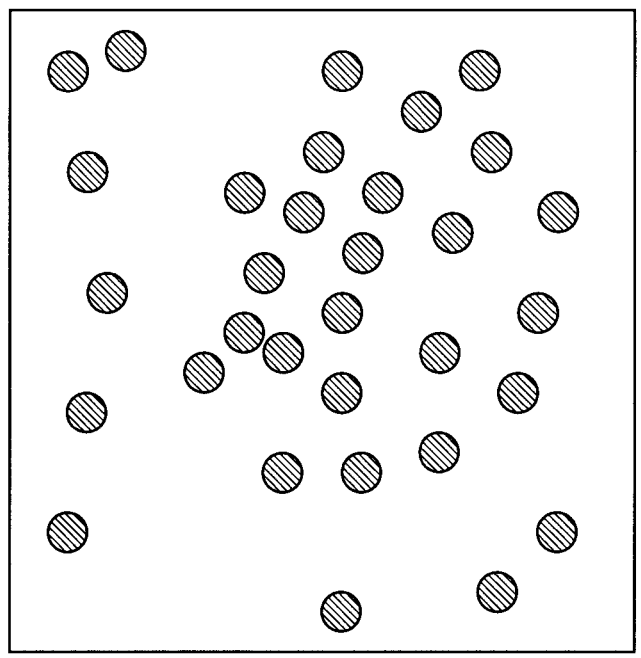
FIGS. 7A and 7B describe a refractive index distribution structure according to a conventional example.
Figure 7B:
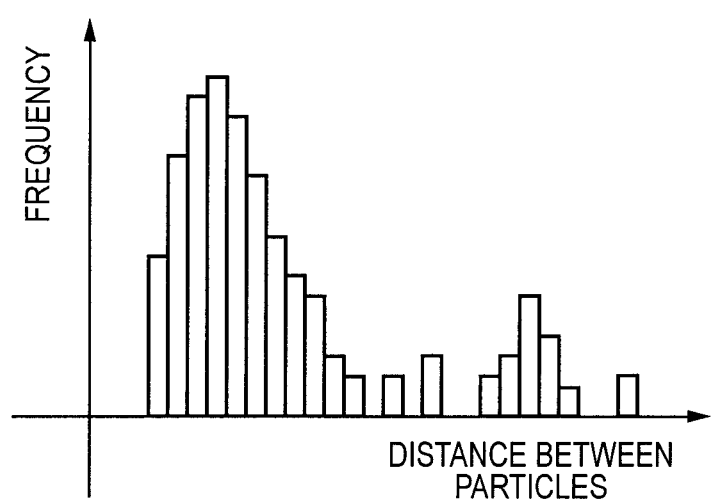

First, a plurality of core-shell microparticles 307 are manufactured assuming that the core diameter is 800 nm, the average value of the shell thickness is 900 nm, and the standard deviation of the shell thickness is 390 nm. The average value of the outer diameter of the core-shell microparticle 307 is 2.6 μm and the standard deviation of the outer diameter is 0.78 μm. As illustrated in FIG. 6A, the thin film 306 as the material for forming the element 304 is formed on the substrate 301, and the core-shell microparticles 307 are densely arranged. Resistant etchant is used to etch the shell portion of the core-shell microparticles 307 and the thin film 306 to form elements 304 (FIG. 6B). Then, as illustrated in FIG. 6C, the core-shell microparticles 307 are removed, a material having a refractive index lower than the refractive index of the element 304 is filled to form a background medium 305 to thereby form a refractive index distribution structure 302. Then, a light emitting layer 303 is formed, whereby the image display apparatus 300 is manufactured.

The aforementioned steps can be used to form the refractive index distribution structure 302 assuming that the inter-element distance La is 2.6 μm and the variation amount Ls of the inter-element distance is 0.3 and to provide an image display apparatus having outside light diffuse reflection characteristics without color breakup and having a high display light extraction efficiency.

Thus, the average value of the outer diameter of the core-shell microparticle corresponds to La in the expressions (2) to (5); and the value twice the standard deviation of the shell thickness corresponds to Ls in the expressions (2) to (5). Specifically, assuming that R denotes the average value of the outer diameter of the core-shell microparticle and Ts denotes the standard deviation of the shell thickness, a refractive index distribution structure having desired light-scattering characteristics can be manufactured by densely arranging the core-shell microparticles satisfying the relation of the following expression (6).

$$0.09 < Ts/R < 0.4 \quad \text{(Expression 6)}$$

More desirably, the following expression (7) is desired to be satisfied.

$$0.135 < Ts/R < 0.3 \quad \text{(Expression 7)}$$

Note that as illustrated in the first embodiment, the arranged core-shell microparticles themselves or a structure without shells may be used as the refractive index distribution structure. Further, a structure whose surroundings are filled with a material having a refractive index lower than the refractive index of the material forming the cores and the shells may be used as the refractive index distribution structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-086193, filed Apr. 8, 2011 which is hereby incorporated by reference herein in its entirety.

What is claimed is:

1. A structure comprising a plurality of core-shell particles, each core-shell particle comprising (1) a shell and (2) a core particle contained in the shell,
   wherein, in at least some of the plurality of the core-shell particles, the core particles have the same core diameter and the shells have a different shell thickness, and
   wherein a shape of a frequency distribution of the number of the core-shell particles with respect to the shell thickness is similar to a shape of a frequency distribution of the number of the core-shell particles with respect to the distance between the core particles,
   wherein the frequency distribution of the number of the core-shell particles with respect to the distance between the core particles is such that:
   (a) in a region smaller than a distance between the core particles which corresponds to a peak value of the frequency, the frequency becomes small as a value of distance between the core particles becomes small, and in a region smaller than the distance between the core particles at which the frequency becomes zero first, the frequency is zero; and
   (b) in a region larger than a distance between the core particles which corresponds to a peak value of the frequency, the frequency becomes small as the value of distance between the core particles becomes large, and in a region larger than the distance between the core particles at which the frequency becomes zero first, the frequency is zero.

2. The structure according to claim 1, wherein the core particle includes a material having a refractive index higher than that of a material included in the shell.

3. The structure according to claim 1, wherein a shape of a frequency distribution of the number of the core-shell particles with respect to the shell thickness is almost the same as a shape of a frequency distribution of the number of the core-shell particles with respect to the distance between the core particles.

4. The structure according to claim 1, wherein when La denotes an average value of distance between the core particles and Ls denotes a variation amount of distance between the core particles, the following expression is satisfied:

$$0.18 < Ls/La.$$

5. The structure according to claim 1, wherein when La denotes an average value of distance between the core particles and Ls denotes a variation amount of distance between the core particles, the following expression is satisfied:

$$Ls/La < 0.8.$$

6. The structure according to claim 1, wherein the core-shell particles in an in-plane direction of arranging the core-shell particles have an area filling factor of 0.5 or higher.

7. The structure according to claim 1, wherein when R denotes an average value of an outer diameter of the core-shell particle and Ts denotes a standard deviation of a shell thickness of the core-shell particle, the following expression is satisfied:

$$0.09 < Ts/R < 0.4.$$

* * * * *